United States Patent
Noland

(10) Patent No.: US 9,712,868 B2
(45) Date of Patent: Jul. 18, 2017

(54) SYSTEMS AND METHODS FOR CONSUMER CONTROL OVER INTERACTIVE TELEVISION EXPOSURE

(75) Inventor: Madeleine Noland, Quincy, MA (US)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/343,657

(22) PCT Filed: Sep. 10, 2012

(86) PCT No.: PCT/US2012/054486
§ 371 (c)(1),
(2), (4) Date: Mar. 7, 2014

(87) PCT Pub. No.: WO2013/036944
PCT Pub. Date: Mar. 14, 2013

(65) Prior Publication Data
US 2014/0229971 A1   Aug. 14, 2014

Related U.S. Application Data

(60) Provisional application No. 61/532,901, filed on Sep. 9, 2011.

(51) Int. Cl.
*H04N 7/16* (2011.01)
*H04N 21/441* (2011.01)
(Continued)

(52) U.S. Cl.
CPC ..... *H04N 21/441* (2013.01); *H04N 21/25875* (2013.01); *H04N 21/25891* (2013.01);
(Continued)

(58) Field of Classification Search
CPC ................................................. H04N 21/441
(Continued)

(56) References Cited

U.S. PATENT DOCUMENTS 5,734,413 A    3/1998   Lappington et al. ......... 725/141
5,809,143 A    9/1998   Hughes
(Continued)

FOREIGN PATENT DOCUMENTS

| EP | 1088446 B1 | 4/2001 |
| JP | 200059756 A | 2/2000 |

(Continued)

OTHER PUBLICATIONS

Provide. Oxford Dictionaries. Oxford University Press, n.d. Web. Feb. 22, 2016. <http://www.oxforddictionaries.com/us/definition/american_english/provide>.*

*Primary Examiner* — Michael B Pierorazio
(74) *Attorney, Agent, or Firm* — Sughrue Mion, PLLC

(57) ABSTRACT

Systems and Methods for allowing a user to control access to interactive television applications and events are provided. One method includes detecting an interactive television event destined for a user's device, and determining at least one of whether the interactive television application event is allowed, disallowed, or conditionally allowed to be executed on the user's device. The determining may include generating a query based on the interactive television application event and checking the query against a preference database containing one or more user preferences.

22 Claims, 9 Drawing Sheets

(51) Int. Cl.
  *H04N 21/45*     (2011.01)
  *H04N 21/454*    (2011.01)
  *H04N 21/475*    (2011.01)
  *H04N 21/478*    (2011.01)
  *H04N 21/258*    (2011.01)
  *H04N 21/2668*   (2011.01)
  *H04N 21/81*     (2011.01)

(52) U.S. Cl.
  CPC ..... *H04N 21/2668* (2013.01); *H04N 21/4532* (2013.01); *H04N 21/4542* (2013.01); *H04N 21/475* (2013.01); *H04N 21/478* (2013.01); *H04N 21/4753* (2013.01); *H04N 21/8173* (2013.01)

(58) Field of Classification Search
  USPC .................................................. 725/25, 30
  See application file for complete search history.

(56) References Cited

U.S. PATENT DOCUMENTS

| | | |
|---|---|---|
| 5,835,740 A | 11/1998 | Wise et al. |
| 5,842,033 A | 11/1998 | Wise et al. |
| 5,878,273 A | 3/1999 | Wise et al. |
| 5,948,040 A | 9/1999 | DeLorme et al. |
| 5,956,519 A | 9/1999 | Wise et al. |
| 6,018,776 A | 1/2000 | Wise et al. |
| 6,026,376 A | 2/2000 | Kenney ............ 705/27 |
| 6,035,126 A | 3/2000 | Wise et al. |
| 6,039,688 A | 3/2000 | Douglas et al. |
| 6,047,112 A | 4/2000 | Wise et al. |
| 6,067,417 A | 5/2000 | Wise et al. |
| 6,134,318 A | 10/2000 | O'Neil |
| 6,148,081 A * | 11/2000 | Szymanski et al. ......... 380/33 |
| 6,178,446 B1 | 1/2001 | Gerszberg et al. ......... 709/217 |
| 6,202,212 B1 * | 3/2001 | Sturgeon et al. ......... 725/141 |
| 6,256,785 B1 | 7/2001 | Klappert et al. ......... 725/136 |
| 6,263,422 B1 | 7/2001 | Wise et al. |
| 6,270,011 B1 | 8/2001 | Gottfried |
| 6,272,176 B1 | 8/2001 | Srinivasan |
| 6,327,619 B1 | 12/2001 | Blumenau |
| 6,330,665 B1 | 12/2001 | Wise et al. |
| 6,338,043 B1 | 1/2002 | Miller |
| 6,360,206 B1 | 3/2002 | Yamashita |
| 6,385,596 B1 | 5/2002 | Wiser et al. |
| 6,418,470 B2 | 7/2002 | Blumenau |
| 6,434,621 B1 | 8/2002 | Pezzillo et al. |
| 6,438,751 B1 | 8/2002 | Voyticky et al. ......... 725/42 |
| 6,460,079 B1 | 10/2002 | Blumenau |
| 6,463,466 B1 | 10/2002 | Weyer |
| 6,507,727 B1 | 1/2003 | Henrick |
| 6,543,052 B1 | 4/2003 | Ogasawara |
| 6,546,413 B1 | 4/2003 | Northrup |
| 6,615,185 B1 | 9/2003 | Bernstein |
| 6,711,256 B1 | 3/2004 | O'Neil |
| 6,718,553 B2 | 4/2004 | Kenworthy ............ 725/118 |
| 6,758,391 B1 | 7/2004 | Pickens, III |
| 6,760,916 B2 | 7/2004 | Holtz et al. |
| 6,769,127 B1 | 7/2004 | Bonomi et al. |
| 6,807,675 B1 | 10/2004 | Maillard et al. |
| 6,847,936 B2 | 1/2005 | Fang et al. |
| 6,868,403 B1 | 3/2005 | Wiser et al. |
| 6,901,436 B1 | 5/2005 | Schneider |
| 6,901,606 B2 | 5/2005 | Wright et al. |
| 6,918,113 B2 | 7/2005 | Patel et al. |
| 6,925,458 B2 | 8/2005 | Scaturro et al. |
| 6,937,972 B1 * | 8/2005 | Van Ee ............ 703/20 |
| 6,937,996 B1 | 8/2005 | Forsythe et al. |
| 6,938,015 B2 | 8/2005 | Joshi et al. |
| 6,957,041 B2 | 10/2005 | Christensen et al. |
| 6,963,898 B2 | 11/2005 | Yoshimine et al. |
| 6,970,886 B1 | 11/2005 | Conwell et al. |
| 6,985,882 B1 | 1/2006 | Del Sesto |
| 7,003,500 B1 | 2/2006 | Driessen |
| 7,051,029 B1 | 5/2006 | Fayyad et al. |
| 7,065,497 B1 | 6/2006 | Brewster et al. |
| 7,065,557 B2 | 6/2006 | Sowden et al. |
| 7,103,557 B2 | 9/2006 | Middeljans et al. |
| 7,103,908 B2 | 9/2006 | Tomsen |
| 7,200,868 B2 | 4/2007 | Mattox et al. |
| 7,222,363 B2 | 5/2007 | Rice et al. |
| 7,240,365 B2 | 7/2007 | de Jong et al. |
| 7,275,156 B2 | 9/2007 | Balfanz et al. |
| 7,299,292 B2 | 11/2007 | Morten et al. |
| 7,444,659 B2 | 10/2008 | Lemmons ............ 725/34 |
| 8,571,538 B2 * | 10/2013 | Sprigg ............ H04W 4/001 455/410 |
| 9,430,342 B1 * | 8/2016 | Byan ............ G06F 9/45533 |
| 2001/0003099 A1 | 6/2001 | Von Hohorn |
| 2001/0014868 A1 | 8/2001 | Herz et al. ......... 705/14 |
| 2001/0025255 A1 | 9/2001 | Gaudian |
| 2001/0029478 A1 | 10/2001 | Laster et al. |
| 2001/0034219 A1 | 10/2001 | Hewitt et al. |
| 2001/0037314 A1 | 11/2001 | Ishikawa ............ 705/67 |
| 2001/0042010 A1 | 11/2001 | Hassell ............ 705/14 |
| 2001/0049617 A1 | 12/2001 | Berenson et al. |
| 2002/0010757 A1 | 1/2002 | Granik et al. ......... 709/218 |
| 2002/0013727 A1 | 1/2002 | Lee |
| 2002/0016848 A1 | 2/2002 | Yoshimine et al. |
| 2002/0026359 A1 | 2/2002 | Long et al. ......... 705/14 |
| 2002/0026420 A1 | 2/2002 | DuPhily |
| 2002/6626420 | 2/2002 | DuPhily |
| 2002/0032603 A1 | 3/2002 | Yeiser |
| 2002/0049037 A1 | 4/2002 | Christensen et al. |
| 2002/0053078 A1 | 5/2002 | Holtz et al. |
| 2002/0059632 A1 | 5/2002 | Link et al. ......... 725/108 |
| 2002/0065034 A1 | 5/2002 | Zhang |
| 2002/0065715 A1 | 5/2002 | Tennyson et al. |
| 2002/0078033 A1 | 6/2002 | Scaturro et al. |
| 2002/0078446 A1 | 6/2002 | Dadss et al. |
| 2002/0083005 A1 | 6/2002 | Lowenstein et al. |
| 2002/0091544 A1 | 7/2002 | Middeljans et al. |
| 2002/0094868 A1 | 7/2002 | Tuck et al. |
| 2002/0095387 A1 | 7/2002 | Sosa et al. |
| 2002/0099564 A1 | 7/2002 | Kim et al. |
| 2002/0103675 A1 | 8/2002 | Vanelli |
| 2002/0104090 A1 | 8/2002 | Stettner ............ 725/60 |
| 2002/0104099 A1 | 8/2002 | Novak |
| 2002/0111865 A1 | 8/2002 | Middleton et al. |
| 2002/0112035 A1 | 8/2002 | Carey et al. |
| 2002/0123956 A1 | 9/2002 | Galuten |
| 2002/0129002 A1 | 9/2002 | Alberts et al. |
| 2002/0129359 A1 | 9/2002 | Lichner |
| 2002/0133562 A1 * | 9/2002 | Newnam et al. ............ 709/216 |
| 2002/0138364 A1 | 9/2002 | Katagiri et al. |
| 2002/0144262 A1 | 10/2002 | Plotnick et al. ............ 725/32 |
| 2002/0147645 A1 | 10/2002 | Alao et al. |
| 2002/0149559 A1 | 10/2002 | Sowden et al. |
| 2002/0151327 A1 | 10/2002 | Levitt |
| 2002/0156866 A1 | 10/2002 | Schneider |
| 2002/0162117 A1 * | 10/2002 | Pearson et al. ............ 725/109 |
| 2002/0174425 A1 | 11/2002 | Markel et al. ............ 725/13 |
| 2002/0198786 A1 | 12/2002 | Tripp et al. |
| 2003/0003990 A1 | 1/2003 | Von Hohorn |
| 2003/0004787 A1 | 1/2003 | Tripp et al. |
| 2003/0004882 A1 | 1/2003 | Holler et al. |
| 2003/0009771 A1 * | 1/2003 | Chang ............ 725/135 |
| 2003/0028429 A1 | 2/2003 | Mittman et al. |
| 2003/0040838 A1 | 2/2003 | Lagunzad et al. |
| 2003/0046083 A1 | 3/2003 | Devinney, Jr. et al. |
| 2003/0052905 A1 | 3/2003 | Gordon et al. |
| 2003/0056210 A1 | 3/2003 | Joshi et al. |
| 2003/0060157 A1 | 3/2003 | Henrick |
| 2003/0083929 A1 | 5/2003 | Springer et al. |
| 2003/0101101 A1 | 5/2003 | Fang |
| 2003/0110080 A1 | 6/2003 | Tsutani et al. |
| 2003/0126275 A1 | 7/2003 | Mungavan et al. |
| 2003/0149781 A1 | 8/2003 | Yared et al. |
| 2003/0154142 A1 | 8/2003 | Ginsburg et al. |
| 2003/0159566 A1 | 8/2003 | Sater et al. |
| 2003/0164557 A1 | 9/2003 | Chung et al. |
| 2003/0172374 A1 | 9/2003 | Vinson et al. |
| 2003/0177101 A1 | 9/2003 | Ferris |

(56) References Cited

U.S. PATENT DOCUMENTS

| | | |
|---|---|---|
| 2003/0187953 A1 | 10/2003 | Pearson et al. |
| 2003/0195806 A1 | 10/2003 | Willman et al. |
| 2003/0195842 A1 | 10/2003 | Reece |
| 2003/0226141 A1 | 12/2003 | Krasnow et al. ............ 725/9 |
| 2003/0229536 A1 | 12/2003 | House et al. |
| 2003/0234819 A1 | 12/2003 | Daly et al. |
| 2004/0009858 A1 | 1/2004 | Tamaribuchi |
| 2004/0010806 A1 | 1/2004 | Yuen et al. ............ 725/136 |
| 2004/0015401 A1 | 1/2004 | Lee et al. |
| 2004/0044535 A1 | 3/2004 | Conner et al. |
| 2004/0046977 A1 | 3/2004 | Silverbrook et al. |
| 2004/0052377 A1 | 3/2004 | Mattox et al. |
| 2004/0054589 A1 | 3/2004 | Nicholas et al. |
| 2004/0054628 A1 | 3/2004 | de Jong et al. |
| 2004/0054629 A1 | 3/2004 | de Jong et al. |
| 2004/0054634 A1 | 3/2004 | Tak |
| 2004/0054750 A1 | 3/2004 | de Jong et al. |
| 2004/0054915 A1 | 3/2004 | Jong et al. |
| 2004/0059629 A1 | 3/2004 | Luo et al. |
| 2004/0059939 A1 | 3/2004 | de Jong |
| 2004/0062379 A1 | 4/2004 | O'Neil |
| 2004/0073688 A1 | 4/2004 | Sampson |
| 2004/0078604 A1 | 4/2004 | Rice et al. |
| 2004/0083133 A1 | 4/2004 | Nicholas et al. |
| 2004/0083215 A1 | 4/2004 | de Jong |
| 2004/0088328 A1 | 5/2004 | Cook et al. |
| 2004/0088420 A1 | 5/2004 | Allen et al. |
| 2004/0117248 A1 | 6/2004 | Dutta et al. ............ 705/14 |
| 2004/0117269 A1 | 6/2004 | Karaoguz et al. |
| 2004/0117303 A1 | 6/2004 | Gamboa |
| 2004/0117827 A1 | 6/2004 | Karaoguz et al. |
| 2004/0117831 A1* | 6/2004 | Ellis et al. ............ 725/53 |
| 2004/0117838 A1 | 6/2004 | Karaoguz et al. |
| 2004/0117842 A1 | 6/2004 | Karaoguz et al. |
| 2004/0122735 A1 | 6/2004 | Meshkin |
| 2004/0128257 A1 | 7/2004 | Okamoto et al. |
| 2004/0128364 A1 | 7/2004 | Clark |
| 2004/0128516 A1 | 7/2004 | Okamoto et al. |
| 2004/0133518 A1 | 7/2004 | Dryall |
| 2004/0133782 A1 | 7/2004 | Sander et al. |
| 2004/0139156 A1 | 7/2004 | Matthews et al. |
| 2004/0139318 A1 | 7/2004 | Fiala et al. |
| 2004/0148638 A1* | 7/2004 | Weisman et al. ............ 725/115 |
| 2004/0182940 A1 | 9/2004 | Biller |
| 2004/0204952 A1 | 10/2004 | Rochet |
| 2004/0221163 A1 | 11/2004 | Jorgensen et al. |
| 2004/0225386 A1 | 11/2004 | Thompson et al. |
| 2004/0230797 A1 | 11/2004 | Ofek et al. |
| 2004/0235567 A1 | 11/2004 | Chatani |
| 2004/0237100 A1 | 11/2004 | Pinder et al. |
| 2004/0249707 A1 | 12/2004 | Park |
| 2005/0010473 A1 | 1/2005 | McLaughlin |
| 2005/0010758 A1 | 1/2005 | Landrock et al. |
| 2005/0010957 A1 | 1/2005 | Muller et al. |
| 2005/0024689 A1 | 2/2005 | House et al. |
| 2005/0027598 A1 | 2/2005 | Greiner |
| 2005/0028200 A1 | 2/2005 | Sardera ............ 725/42 |
| 2005/0038702 A1 | 2/2005 | Merriman et al. |
| 2005/0038749 A1 | 2/2005 | Fitch et al. |
| 2005/0091107 A1 | 4/2005 | Blum |
| 2005/0111663 A1 | 5/2005 | Lotspiech et al. |
| 2005/0120125 A1 | 6/2005 | Morten et al. |
| 2005/0131834 A1 | 6/2005 | Rodriguez et al. |
| 2005/0138560 A1 | 6/2005 | Lee et al. |
| 2005/0144020 A1 | 6/2005 | Muzaffar et al. |
| 2005/0144126 A1 | 6/2005 | Commodore et al. |
| 2005/0147247 A1* | 7/2005 | Westberg et al. ............ 380/200 |
| 2005/0171897 A1 | 8/2005 | Forsythe et al. |
| 2005/0182956 A1 | 8/2005 | Ginter et al. |
| 2005/0185398 A1 | 8/2005 | Scannell |
| 2005/0188853 A1 | 9/2005 | Scannell |
| 2005/0204019 A1 | 9/2005 | Flynn et al. |
| 2005/0229209 A1 | 10/2005 | Hildebolt et al. |
| 2005/0230038 A1 | 10/2005 | Guckert et al. |
| 2005/0234789 A1 | 10/2005 | Czyzewski et al. |
| 2005/0239495 A1 | 10/2005 | Bayne ............ 455/550.1 |
| 2005/0267805 A1 | 12/2005 | Tarantino |
| 2005/0283791 A1 | 12/2005 | McCarthy et al. |
| 2005/0289002 A1 | 12/2005 | Mathis, Jr. |
| 2005/0289630 A1 | 12/2005 | Andrews et al. |
| 2006/0020523 A1 | 1/2006 | Song |
| 2006/0020548 A1 | 1/2006 | Flather |
| 2006/0031153 A1 | 2/2006 | Kim |
| 2006/0031499 A1 | 2/2006 | Yoshimine et al. |
| 2006/0031500 A1 | 2/2006 | Yoshimine et al. |
| 2006/0031501 A1 | 2/2006 | Yoshimine et al. |
| 2006/0031502 A1 | 2/2006 | Yoshimine et al. |
| 2006/0036484 A1 | 2/2006 | Voticky |
| 2006/0036742 A1 | 2/2006 | Yoshimine et al. |
| 2006/0041480 A1 | 2/2006 | Briggs |
| 2006/0053051 A1 | 3/2006 | Goodman |
| 2006/0053067 A1 | 3/2006 | Driessen |
| 2006/0059053 A1 | 3/2006 | Payne |
| 2006/0068758 A1 | 3/2006 | Dharmadhikari et al. |
| 2006/0069612 A1 | 3/2006 | Hurt et al. |
| 2006/0080170 A1 | 4/2006 | Roach et al. |
| 2006/0080172 A1 | 4/2006 | Najarian et al. |
| 2006/0089843 A1 | 4/2006 | Flather |
| 2006/0089875 A1 | 4/2006 | Park et al. |
| 2006/0095337 A1 | 5/2006 | Morgan |
| 2006/0101489 A1 | 5/2006 | Roden et al. |
| 2006/0116924 A1 | 6/2006 | Angles et al. |
| 2006/0123053 A1 | 6/2006 | Scannell |
| 2006/0123449 A1 | 6/2006 | Ma et al. |
| 2006/0129490 A1 | 6/2006 | Collar et al. |
| 2006/0129502 A1 | 6/2006 | Pastusiak et al. |
| 2006/0136226 A1* | 6/2006 | Emam ............ 704/277 |
| 2006/0136335 A1 | 6/2006 | Ferguson |
| 2006/0143084 A1 | 6/2006 | Donnelli et al. ............ 705/14 |
| 2006/0148454 A1 | 7/2006 | Welch |
| 2006/0154642 A1 | 7/2006 | Scannell |
| 2006/0156409 A1 | 7/2006 | Chladek |
| 2006/0174266 A1* | 8/2006 | Gatto et al. ............ 725/37 |
| 2006/0190616 A1 | 8/2006 | Mayerhofer et al. |
| 2006/0206912 A1 | 9/2006 | Klarfeld et al. ............ 725/40 |
| 2006/0219776 A1 | 10/2006 | Finn |
| 2006/0230415 A1 | 10/2006 | Roeding ............ 725/34 |
| 2006/0272022 A1 | 11/2006 | Loukianov et al. |
| 2007/0016918 A1 | 1/2007 | Alcorn et al. ............ 725/22 |
| 2007/0022434 A1 | 1/2007 | Oh |
| 2007/0061838 A1 | 3/2007 | Grubbs et al. ............ 725/35 |
| 2007/0088812 A1 | 4/2007 | Clark |
| 2007/0089137 A1 | 4/2007 | Clark |
| 2007/0089157 A1 | 4/2007 | Clark |
| 2007/0089158 A1 | 4/2007 | Clark |
| 2007/0156611 A1 | 7/2007 | Gupta et al. |
| 2007/0156890 A1 | 7/2007 | Promny ............ 709/224 |
| 2007/0157234 A1* | 7/2007 | Walker ............ 725/38 |
| 2007/0157251 A1 | 7/2007 | Shrivastava et al. ............ 725/60 |
| 2007/0162967 A1 | 7/2007 | de Jong et al. |
| 2007/0169189 A1 | 7/2007 | Crespo |
| 2007/0198436 A1 | 8/2007 | Weiss |
| 2007/0204044 A1 | 8/2007 | Rice et al. |
| 2007/0241189 A1 | 10/2007 | Slavin et al. |
| 2007/0250901 A1 | 10/2007 | McIntire et al. ............ 725/146 |
| 2007/0288951 A1 | 12/2007 | Ray et al. ............ 725/23 |
| 2007/0300273 A1 | 12/2007 | Turner ............ 725/105 |
| 2007/0300280 A1 | 12/2007 | Turner et al. ............ 725/135 |
| 2008/0006002 A1 | 1/2008 | Strickland et al. |
| 2008/0046945 A1 | 2/2008 | Hanley ............ 725/112 |
| 2008/0060002 A1 | 3/2008 | Noll et al. ............ 725/35 |
| 2008/0114648 A1 | 5/2008 | Chen et al. ............ 705/14 |
| 2008/0134043 A1 | 6/2008 | Georgis et al. ............ 715/733 |
| 2008/0216108 A1 | 9/2008 | Beaunoir et al. |
| 2008/0228868 A1* | 9/2008 | Sivakoff ............ 709/203 |
| 2008/0263581 A1 | 10/2008 | Turner ............ 725/22 |
| 2008/0288600 A1 | 11/2008 | Clark |
| 2009/0019061 A1 | 1/2009 | Scannell, Jr. |
| 2009/0094632 A1* | 4/2009 | Newnam et al. ............ 725/24 |
| 2009/0199230 A1 | 8/2009 | Kumar et al. ............ 725/32 |
| 2010/0100831 A1* | 4/2010 | Whytock et al. ............ 715/764 |
| 2010/0128595 A1* | 5/2010 | Karaoguz ............ H04L 1/1829 370/216 |
| 2010/0262990 A1 | 10/2010 | Nishida |

(56) References Cited

U.S. PATENT DOCUMENTS

| | | | | |
|---|---|---|---|---|
| 2010/0293160 | A1* | 11/2010 | Aravamudan et al. | 707/734 |
| 2010/0313223 | A1* | 12/2010 | Straub | 725/60 |
| 2010/0333133 | A1* | 12/2010 | Krakirian et al. | 725/32 |
| 2011/0237318 | A1* | 9/2011 | Sama | 463/9 |
| 2012/0172117 | A1* | 7/2012 | Doorgeest | 463/31 |
| 2013/0174194 | A1* | 7/2013 | Mooneyham | 725/28 |
| 2014/0278834 | A1* | 9/2014 | Lautz et al. | 705/12 |
| 2016/0212119 | A1* | 7/2016 | Yang | H04L 9/3226 |

FOREIGN PATENT DOCUMENTS

| | | |
|---|---|---|
| JP | 2010251996 A | 11/2010 |
| WO | 99/66714 A1 | 12/1999 |
| WO | WO-9966381 | 12/1999 |
| WO | WO-0116900 | 3/2001 |
| WO | WO-0127788 | 4/2001 |
| WO | WO-0133501 | 5/2001 |
| WO | WO-0150429 | 7/2001 |
| WO | WO-0213073 | 2/2002 |
| WO | WO 02/35822 | 5/2002 |
| WO | WO-02052813 | 7/2002 |
| WO | WO-03015370 | 2/2003 |
| WO | WO-03025720 | 3/2003 |
| WO | WO-03093961 | 11/2003 |
| WO | WO-2004031899 | 4/2004 |
| WO | WO-2004038997 | 5/2004 |
| WO | WO-2004099940 | 11/2004 |
| WO | WO-2005001618 | 1/2005 |
| WO | WO-2006002238 | 1/2006 |
| WO | WO-2006014721 | 2/2006 |
| WO | WO-2006030410 | 3/2006 |
| WO | WO-2006039053 | 4/2006 |
| WO | WO-2006059140 | 6/2006 |
| WO | WO-2006059140 A1 | 6/2006 |
| WO | WO-2006073489 | 7/2006 |
| WO | WO-2006073489 A1 | 7/2006 |
| WO | WO-2006084278 | 8/2006 |
| WO | WO-2006084278 A2 | 8/2006 |
| WO | WO-2007046020 | 4/2007 |
| WO | WO-2007084851 | 7/2007 |
| WO | WO-2007084851 A2 | 7/2007 |
| WO | WO-2007125486 | 11/2007 |
| WO | WO-2007125486 A2 | 11/2007 |
| WO | WO-2007144852 | 12/2007 |
| WO | WO-2007144852 A2 | 12/2007 |
| WO | WO-2007145687 | 12/2007 |
| WO | WO-2007145687 A1 | 12/2007 |
| WO | WO-2008061184 | 5/2008 |
| WO | WO-2009075755 | 6/2009 |

* cited by examiner

| Field | Type | Null | Key | Default | Example | Description |
|---|---|---|---|---|---|---|
| id | int(11) | NO | PRI | | 25 | Account ID, incremental value as records are created |
| crypted_password | varchar(40) | YES | | | ab0c5aa369/37492f4edb7d636aaa15a1d2b4es | Encrypted password using the "SALT" column |
| salt | varchar(40) | YES | | | 11c322ef6ec3880c60348160c5abe8c708eb2b741 | Field used to generate the crypted password |
| reportable | tinyint(1) | YES | | 1 | | Account included in reporting data thru TVLM Reports |
| email | varchar(255) | YES | MUL | | kloffis3348@thology.net | Account holder email |
| location | varchar(255) | YES | | | | Cable Operator Account Location |
| status | varchar(255) | YES | | | registered | Status (Opt-Out, Registered, Unregistered) |
| subscriber_id | varchar(255) | YES | MUL | | | primary subscriber ID from Cable Operator |
| updated_at | datetime | YES | | | 2011-02-11 14:90:08 | Record modified date / time |
| created_at | datetime | YES | | | 2011-01-19 00:18:11 | Record creation date / time |
| owner_id | int(11) | NO | MUL | | 2 | Linked to Owner table ID field |
| email_each_click | tinyint(1) | YES | | 1 | | Deliver one email per click to subscriber |
| email_click_summary | varchar(255) | YES | | weekly | weekly | Deliver summary email weekly for all clicks to end user |
| zipcode | varchar(255) | YES | | | | Account holder zip code |
| reason | text | YES | | | | Opt in Reason information |
| reason_text | text | YES | | | | Opt in Reason information |
| clicks_per_page | int(11) | YES | | | | Displays clicks per page in Consumer Portal |
| encrypted_email | varchar(40) | YES | MUL | | braf148f1557ca4621d272ee9796c1b26e79f6a | Encrypted Email information |

| Field | Type | Null | Key | Default | Example | Description |
|---|---|---|---|---|---|---|
| id | int(11) | NO | PRI | | 385 | Primary Record Key ID |
| account_id | int(11) | YES | | | 709 | Account linked to this STB |
| location_id | int(11) | NO | MUL | | | Key link to Provider_Locations Table |
| device_id | varchar(1001) | NO | MUL | | setbcrcom:id:ab | Device UID |
| model_type_code | varchar(4) | YES | | | | STB type information |
| model | varchar(255) | YES | | | 8026597 | STB model type information |
| abif_engine | varchar(255) | YES | | | 1 | ABIF engine that loaded in the STB |
| with_account_since | datetime | YES | | | 2011-01-12 17:01:00 | Date the STB became associated with this account |
| created_at | datetime | YES | | | 2011-03-15 05:33:39 | Record creation date / time |
| updated_at | datetime | YES | | | 2011-03-23 14:00:18 | Record modified date / time |

| Field | Type | Null | Key | Example | Description |
|---|---|---|---|---|---|
| id | int(11) | NO | PRI | 26 | Primary ID Field |
| adss_id | int(11) | YES | MUL | 1 | Identifies the server that executed the Playout |
| tid | varchar(255) | | MUL | 1295296824221720 | Token ID used to identify the IVT event playout |
| insertion_type | varchar(255) | | MUL | VDCP | types, (HOTBUTTON, PLAYNOW, VDCP) |
| segment_id | int(11) | | MUL | 18 | Key link to the Content Segment Table |
| result | varchar(255) | | | PLAY_CMPLT | Playout Result (Play_CMPLT, Play_ABORT) |
| start | datetime | | MUL | 2011-01-20 06:35:41 | Playout Start Time |
| end | datetime | | MUL | 2011-01-20 06:36:35 | Playout End Time |
| created_at | datetime | | | 2011-01-20 14:36:45 | Record creation date / time |
| updated_at | datetime | | | 2011-01-20 14:36:45 | Record modified date / time |
| news_user | varchar(255) | | | Unknown | Newscast user that launched the HOTBUTTON |
| house_number | varchar(255) | | | D7112 | Associated AD House Number |
| confirmed | tinyint(1) | | | | Playout Confirmed with information stored in TVLM |
| hotkey_button_id | int(11) | | | | Hotkey Button ID if playout was for HOTBUTTON otherwise null |

FIG. 7

| Component | Description | Data Size or Type |
|---|---|---|
| deviceid | MAC address or it may be some other device id | AA:BB:CC:DD:EE:FF |
| devicetype | Specific STB models are defined | SAS134 |
| Softwareversion | internally defined in the application | String |
| tid | ID of iTV event requesting to be played | String |

309

```
<message type="iVT_event_check">
  <bcnparam name="deviceid" value="aa:bb:cc:dd:11:ab"/>
  <bcnparam name="devicetype" value="DCT2010"/>
  <softwareversion>INFV1</softwareversion>
  <tid>11520691123</tid>
</message>
```

FIG. 8

| Component | Data Size or Type | Description |
|---|---|---|
| status | Unknown | This device or this ITV event was not found in database. Render ITV event by default. |
| | Unregistered | The subscriber has neither opted-in nor opted-out for this ITV event. Render ITV event by default |
| | Registered | The subscriber has opted-in for this ITV event. Render ITV event |
| | Opt-out | The subscriber has opted-out for this ITV event. Do not render ITV event |

309

```
<message name="..." event="response">
  <parameters name="currentstatus" value="unknown/unregistered/registered/opt-out"/>
</message>
```

FIG. 9

120
SYSTEMS AND METHODS FOR CONSUMER CONTROL OVER INTERACTIVE TELEVISION EXPOSURE

TECHNICAL FIELD

The subject matter disclosed herein relates to interactive television, and more particularly relates to consumer control over interactive television exposure.

BACKGROUND

Interactive TV (ITV) applications enable viewers to interact with content they see on television. For example, an ITV application (ITV app) can allow a consumer to be presented with a polling event while watching election coverage on his or her favorite news station. The viewer can respond to the poll using his television remote control. There are numerous types of ITV applications such as Request for Info or RFI (to receive a coupon, brochure, etc.), trivia, and games, accessing news headlines or weather updates, and even click-to-buy or t-commerce. Programmers can create one or more "events" (referred herein as "ITV application event(s)" or simply "ITV event(s)") that utilize a given ITV application for a particular presentation to users. Following the example above, a voting/polling ITV application may be provided and an event of the voting/polling ITV application may be, for example, a particular question associated with a particular television show, such as "As of today, do you plan to vote for the Democrat or the Republican? A] Democrat; B] Republican; C] Independent; D] Undecided". The same voting and polling app can be used for a different event in which another question and/or answer set is presented to viewers that pertains to different television content.

ITV offers many benefits to the marketplace. For example, ITV can provide consumers with a deeper and richer experience with the content they enjoy and the convenience of receiving information and products through the television medium. ITV can also provide programmers and advertisers new opportunities to develop relationships with individual consumers and gain new metrics on consumer behavior not available through the traditional television measurement processes (e.g. number of responses to an ITV offer), and distributors envision new services to offer to subscribers.

Currently, consumers have very little control over their ITV experiences. For example, in the cable television distribution network, the cable operator does not enable a consumer to select which ITV applications they are exposed to. The cable operator can disallow an ITV application to all its subscribers, or it can disallow all ITV applications from a given subscriber, but it does not allow some ITV applications to be selectively available to some subscribers and not to others.

Thus there is a need for technology that enables consumers to control their ITV experiences in such a way that works for all parties in the television ecosystem. This benefits the consumer, for example, by enabling him or her to shield children from ITV offers (i.e. ITV application parental control), and to control their own television experience. This also benefits programmers, advertisers and distributors. For example, consumer feedback allows them to develop ITV applications and offers that are most desirable to consumers.

SUMMARY

Embodiments of the present subject matter relate to systems and methods for allowing a user to control exposure to an interactive television application event. In some embodiments, the methods may include detecting an interactive television event destined for a user's device and determining at least one of whether the interactive television application event is allowed, disallowed, or conditionally allowed to be executed on the user's device. In some embodiments, the determining further includes generating a query based on the interactive television application event, and checking the query against a preference database containing one or more user preferences.

In some embodiments, if the interactive television application event is conditionally allowed to be executed on the user's device, the method may further include generating a prompt to the user for a required input, receiving the input from the user, and checking whether the input meets a specific condition before executing the interactive television event on the user's device. The required input may be, for example, a PIN (personal identification number).

In some embodiments of the present subject matter, the preference database includes data indicative of one or more circumstances for allowing, disallowing, or conditionally allowing the interactive television application event to be executed on the user's device. The one or more circumstances may include one or more of: an identification of the user's device, channel information, a type of service, a type of programming, a type of offer, a type of product, time of day, day of week, password protection, program rating, and a viewing device type.

In some embodiments, the present subject matter provides a user interface through which the user can define one or more circumstances for allowing, disallowing, or conditionally allowing the interactive television application event to be executed on the user's device in given circumstances.

In some embodiments, the preference database is stored on the user's device. In some embodiments, the preference database is stored on a central server. The preference database may be copied from the central service to a database on the user's device. The preference database may also be copied to a second user device.

In some embodiments of the present subject matter, a system for allowing a user to control access to an interactive television application event is provided. The system may include one or more computer processors configured to detect an interactive television application event destined for a user's device, and determine at least one of whether the interactive television application event is allowed, disallowed, or conditionally allowed to be executed on the user's device. The system may also include means for generating a query based on the interactive television application event, and means for checking the query against a preference database containing one or more user preferences. In some embodiments, the system further includes means for generating a prompt to the user for a required input if the interactive television is determined to be conditionally allowed, means for receiving the input from the user, and means for checking whether the input meets a specified condition before executing the interactive television event on the user's device. In some embodiments, the required input is a PIN or further instructions from the user.

In some embodiments, the present subject matter provides a non-transitory computer-readable medium including computer instructions for performing the method including detecting an interactive television event for an interactive television application sent to a user's device, and determining at least one of whether the interactive television application is allowed, disallowed, or conditionally allowed to be executed on the user's device.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages including, for example, enabling consumers to set preferences for their ITV experience, enabling execution of those preferences to occur automatically and efficiently, and enabling programmers, advertisers and distributors to know these preferences. This benefits the consumer, for example, by providing parental control over ITV offers, and/or to control their own television experience. This also benefits programmers, advertisers and distributors by providing consumer feedback, which allows them to develop ITV applications and offers that are more desirable, targeted and the like to consumers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 illustrates an exemplary data table for storing the consumer preference for Clickable TV.

FIG. 6 illustrates an exemplary data table for storing a consumer's television device(s) to which his preferences should apply.

FIG. 7 illustrates an exemplary data table for storing Clickable TV events.

FIG. 8 illustrates an exemplary query from the television device to the database to determine whether to execute a Clickable TV event.

FIG. 9 illustrates an exemplary response from the database to the device as to whether to execute a Clickable TV event.

DETAILED DESCRIPTION

Figure 1:
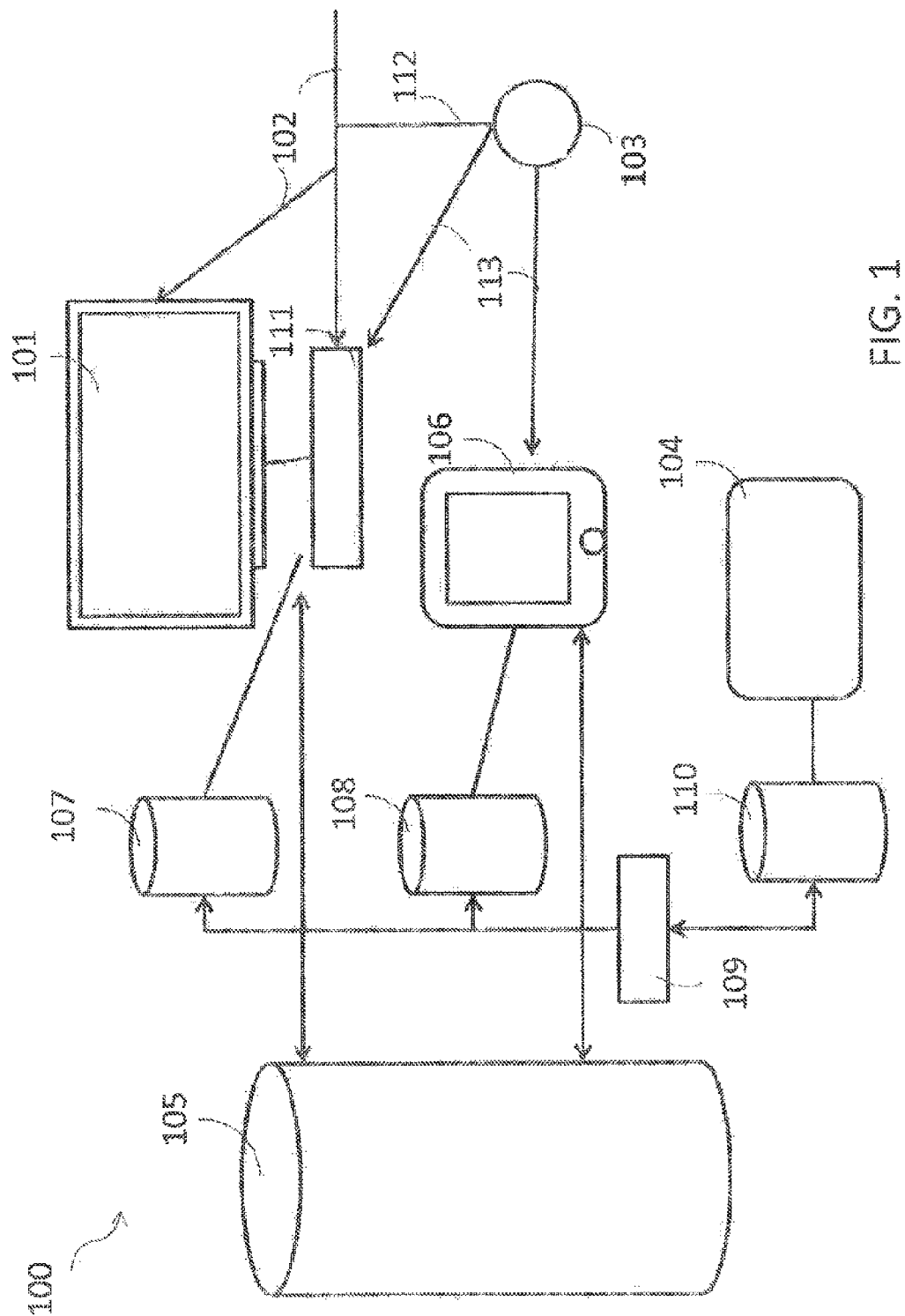
FIG. 1 is a diagram illustrating an exemplary embodiment in accordance with the present subject matter.

The present subject matter may be implemented in a configuration in which the consumer is a subscriber to a television service provided by a television distributor; the distributor has control over the ITV applications being offered, both directly from the distributor and from the programmers and advertisers providing the television content being distributed; and the viewer's receiving device can be instructed to execute (e.g. render, play, etc.) ITV applications. The viewer may also have a companion device, separate from his viewing device that is likewise capable of being instructed to execute (e.g. render, play, etc.) ITV applications.

For example, a distributor such as Comcast may offer interactive television via one of several standards, including Enhanced Television Binary interchange Format (EBIF) or tru2way. Comcast may offer ITV services directly, such as interactivity on the Program Guide, and may also choose to allow ITV applications initiated by the programmers, such as, for example, a voting and polling ITV event in a news program, to reach their subscribers' homes in which set-top boxes (STB) capable of executing interactive applications are provided.

Other examples of such distributors include satellite providers (e.g. DISH Network), over-the-air providers (e.g. local television station), telco providers (e.g. Verizon FiOS), and streaming service providers (e.g. Netflix). Other examples of consumer receiving devices include computers, "smart" TVs, gaming consoles (e.g. Xbox), a variety of streaming service receivers (e.g. Roku box), smartphones, tablets, computers, etc. Examples of companion devices include tablets, smartphones, and computers.

The consumer may be provided with an interface for viewing his provider's ITV offerings. Alternatively or additionally, the interface may include, for example, one or more of: a list of his viewing devices, a list of his companion devices, a list of his television programming offerings, and a list of his television service offerings. This interface could be offered via any number of means; examples include a website, an interface on the consumer's viewing device, contacting the distributor's customer service representative (CSR), etc. The interface is connected to the provider's central database system via the Internet or the return path of its television network or other means.

From this interface the consumer is able to identify his ITV preferences including, for example, which interactive applications he wishes to be exposed to. The consumer may also be able to, for example, specify a variety of circumstances and cases for allowing ITV applications, such as which viewing devices (e.g. living room vs. children's room ITV), which companion devices (e.g. iPad, Android phone), which channels (e.g. ESPN vs. Cartoon Network), which services (e.g. linear vs. video on demand), which types of programming (e.g. news vs. soap operas), which types of otters (e.g. request for info vs. click-to-buy), which types of products (e.g. autos vs. toys), which times of day, which days of the week, password protection (e.g. PIN entry is required vs. not), program rating (e.g. TVPG vs. TVMA), viewing device type (e.g. STB vs. tablet device), ask me first (e.g. "Trivia is available. Play?"), etc. The consumer may be able to select a variety of combinations of preferences, for example trivia and game ITV applications are allowed on any channel, anytime and on any device without PIN entry, but click-to-buy ITV applications are restricted to Monday-Friday on the living room STB during Prime Time viewing hours with PIN entry required.

In some embodiments of the present subject matter, the database will return allowance or disallowance. In some embodiments the database will return conditional allowance (e.g. PIN verification required or prompt the consumer to allow or disallow). In some embodiments of the present subject matter, the app is delivered in more than one form and the system will return a version of the app that is allowed (e.g. request for info on the product is allowed, click-to-buy is not allowed).

The preferences that the consumer specifies through the interface are stored in a database. The database may be stored locally on the consumer's viewing device, centrally in the provider's system, on an external device that can be accessed as needed such as a home-networked computer, or some combination of storage locations. For example, the consumer's preferences may be stored locally on the viewing device(s) for optimal performance, and also stored centrally in the provider's system so that consumer's preferences can be restored to the local device if needed (e.g. if the viewing device suffers a memory loss during a power outage or if the viewer acquires a new device that should adopt the preferences). Additionally, there may be data stored in the permanent memory of the viewing device that holds default rules for executing ITV applications if the preferences database is unavailable.

In addition to setting preferences for existing ITV applications, the consumer may also be able to set default preferences for new ITV applications, new viewing devices that the consumer acquires, new television channels and services, etc. In some embodiments, such default preferences are based on previous preferences set by the consumer. Additionally, the provider may specify the defaults instead of or in addition to the consumer. In the case in which both consumer and provider default preferences are set, in some embodiments, the consumer's default preferences override the provider's default preferences if there is a conflict. The default preferences may be stored in a database and applied accordingly until the consumer specifies new preferences via the interface.

The consumer preferences database may additionally be linked to the provider's subscriber database which maintains the device IDs associated with consumers' accounts so that if a consumer swaps out (e.g. replaces) a viewing device, the new viewing device will automatically adopt the previous device's preference settings. Additionally, if the swapped out device is deployed to a different consumer's home, the previous consumer's preferences will not be applied to the viewing device in its new home. For example, if a consumer that has a standard definition (SD) STB in the living room, upgrades that device to a high definition (HD) STB, it is desirable that the consumer's preferences for his living room STB be automatically applied to the new HD STB, and also that when the old SD STB is placed in a different home it is no longer associated with the original owner's preferences. In some embodiments, this linkage may be "real time" in which changes to device ownership are reflected immediately in the consumer's ITV experience. In some embodiments, this linkage may be "batched" in which changes to device ownership are periodically updated in the ITV preferences database in a batch, for example every 24 hours.

In some embodiments, the ITV application is delivered "in-band" to the viewing device which means it is delivered as part of the broadcast stream along with the audio, video, closed captioning and other components of the program (aka "bound app"). In this case the viewing device detects the ITV application within the broadcast stream. In-band ITV applications can be "pre-bound" or "late-bound." Pre-bound applications are embedded in the video content file prior to broadcast. Late-bound applications are added to the broadcast stream at the moment of broadcast. Late-binding can be done at the programming source (e.g. ESPN studios) or at the distribution source (e.g. Comcast headend) or some other point along the broadcast chain.

In one embodiment the ITV application is delivered to or accessed by the viewing device "out-of-band," i.e. via a different means than within the broadcast stream (aka "unbound app"). Out-of-Band ITV applications may be stored locally on a viewing device or stored centrally within the provider's system. ITV applications delivered to a companion device rather than the primary viewing device are also similar to this. Out-of-band ITV applications may be triggered by an event such as when the viewer accesses the Program Guide, by a preset schedule, when the viewer tunes to a particular channel, or some other means.

In some embodiments, the viewing or companion device receives the request to execute the ITV event regardless of the consumer's preferences. For example, a voting and polling ITV event that is embedded in-band in a program stream would reach all viewers tuned to the program regardless of the viewers' ITV preferences. In this case the viewing device executes a query prior to executing the ITV event. The query includes the data necessary to determine whether the ITV event should be executed or not according to the consumer's preference settings. If the preferences database is stored locally, the viewing device compares the ITV application and event circumstances to this local database and determines whether to execute the ITV event or not. If the preferences database is not stored locally, for example, by design or due to a local memory loss on the device, the viewing device sends the query to a non-local database and awaits a response of allowance, disallowance, or conditional allowance. If the preferences result in allowance, the viewing device executes the ITV event. If the preferences result in conditional allowance, the viewing device executes the ITV event if the required one or more (including all) conditions are met.

In some embodiments, the preferences database is consulted prior to sending the ITV application to the viewing or companion device, and if disallowed, the ITV application is not sent to the device at all. In some embodiments, this is provided for unicast broadcasts such as video-on-demand (VOD) or Internet streaming or multi-cast broadcasts in which the ITV application is delivered out-of-band.

In some embodiments, the system can be set to provide notification to the viewer each time an ITV app is blocked by their preferences and the viewer can choose to allow the app to run this time only, allow the app to always run including this time, dismiss the message, or dismiss the message and request not to see such messages in the future.

FIG. 1 illustrates an exemplary embodiment according to the present subject matter. A provider's programming is being delivered to the provider's subscriber's viewing device 101 via a program stream 102. The program stream 102 may be a cable or telco television feed via coaxial cable and/or fiber-optic cable, a satellite feed received by a home satellite dish, an over-the-air signal from a television station and received by a home antenna, an Internet streaming feed, or other source. The program stream 102 may be a linear feed or video-on-demand (VOD) feed and may be unicast or multicast.

A viewing device 101 is the device on which the viewer sees the video programming. The viewing device 101 may be, for example, a television, computer, tablet, smartphone or other device capable of rendering video media. In some embodiments, the viewing device is connected to an external device 111 such as a set-top box (STB), gaming console, streaming content receiver or similar equipment. In those embodiments, the programming stream 102 passes through the external device 111 prior to rendering video on the viewing device 101.

During the course of viewing video, interactive events 103 may be triggered to be delivered to the consumer. Interactive events 103 may be embedded "in-band" in the program stream 102 to be received by the external device 111 or the viewing device 101 directly. Alternatively, the ITV Events 103 may be streamed "out-of-band" either to the viewing device 101, external device 111, or to a companion device 106. In some embodiments, the companion device 106 does not display the video programming, but is used by the consumer in conjunction with the viewing device 101 and/or the external device 111.

The consumer may access an ITV Preferences User Interface 104 which may be a website, a means of contacting the provider's customer service representative (CSR) or may be accessed on the viewing device 101 or companion device 106. The consumer uses this UI to set his ITV preferences including, for example, which interactive applications the consumer wishes to be exposed to. The consumer may also be able to specify one or more circumstances and cases for allowing ITV applications, such as which viewing devices (e.g. living room vs. children's room ITV), which companion devices (e.g. iPad, Android phone), which channels (e.g. ESPN vs. Cartoon Network), which services (e.g. linear vs. video on demand), which types of programming (e.g. news vs. soap operas), which types of offers (e.g. request for info vs. click-to-buy), which types of products (e.g. autos vs. toys), which times of day, which days of the week, password protection (e.g. PIN entry is required vs. not), program rating (e.g. TVPG vs. TVMA), viewing device type (e.g. STB vs. tablet device), and/or ask me first (e.g. "Trivia is available. Play?"), etc. The consumer may be able to select one or more combinations of preferences, for example trivia and game ITV applications are allowed on any channel, anytime and on any device without PIN entry, but click-to-buy ITV applications are restricted to Monday-Friday on the living room STB during Prime Time viewing hours with PIN entry required.

ITV Preferences are stored in one or more databases including at least one of a local database 107 on the viewing device or external device, a local database on the companion device 108, a local database 110 connected to the viewing device 101 or companion device 106 via a home network 109, and a central database 105 located on a remote server such as at the provider's headend. In some embodiments, the consumer's preferences may be stored in multiple locations (e.g. on the local database and the central database) so that the preferences can be restored to the local device if needed (e.g. if the viewing device suffers a memory loss during a power outage). Additionally, there may be data stored in the permanent memory of the viewing device, external device, and/or the companion device that holds default rules for deciding whether to execute ITV applications if the preferences database is unavailable.

In some embodiments, the ITV application is delivered "in-band" 112 to the viewing device which means it is delivered as part of the broadcast stream along with the audio, video, closed captioning and other components of the program (aka "bound app"). In this case the viewing device detects the ITV application within the broadcast stream. In some embodiments, the ITV application is delivered "out-of-band" 113 separately from the programming stream.

In some embodiments, the viewing or companion device receives the request to execute the ITV application regardless of the consumer's preferences. In this case the viewing device executes a query to one or more databases 105, 107, 108 and/or 110 prior to executing the ITV application. The query includes the data necessary to determine whether the ITV application should be executed or not according to the consumer's preference settings. If the preferences database is stored locally 107 or 108, the viewing or companion device compares the ITV application circumstances to this local database and determines whether to execute the ITV application or not. If the preferences database is not stored locally, for example, by design or due to a local memory loss on the device, the viewing device sends the query to the location of the database 105 or 110 and awaits a response of allowance, disallowance or conditional allowance. If the preferences result in allowance, the viewing or companion device executes the ITV application. In some embodiments, this is provided for multicast broadcasts when the ITV application is delivered in-band such as main channel linear viewing in a cable network with an EBIF event embedded in the program stream.

In some embodiments, the preferences database is consulted prior to sending the ITV application to the viewing or companion device and if disallowed, the ITV application is not sent to the device at all. In some embodiments, this is provided for unicast broadcasts such as video-on-demand (VOD) or Internet streaming or multi-cast broadcasts in which the ITV application is delivered out-of-band.

Figure 2:
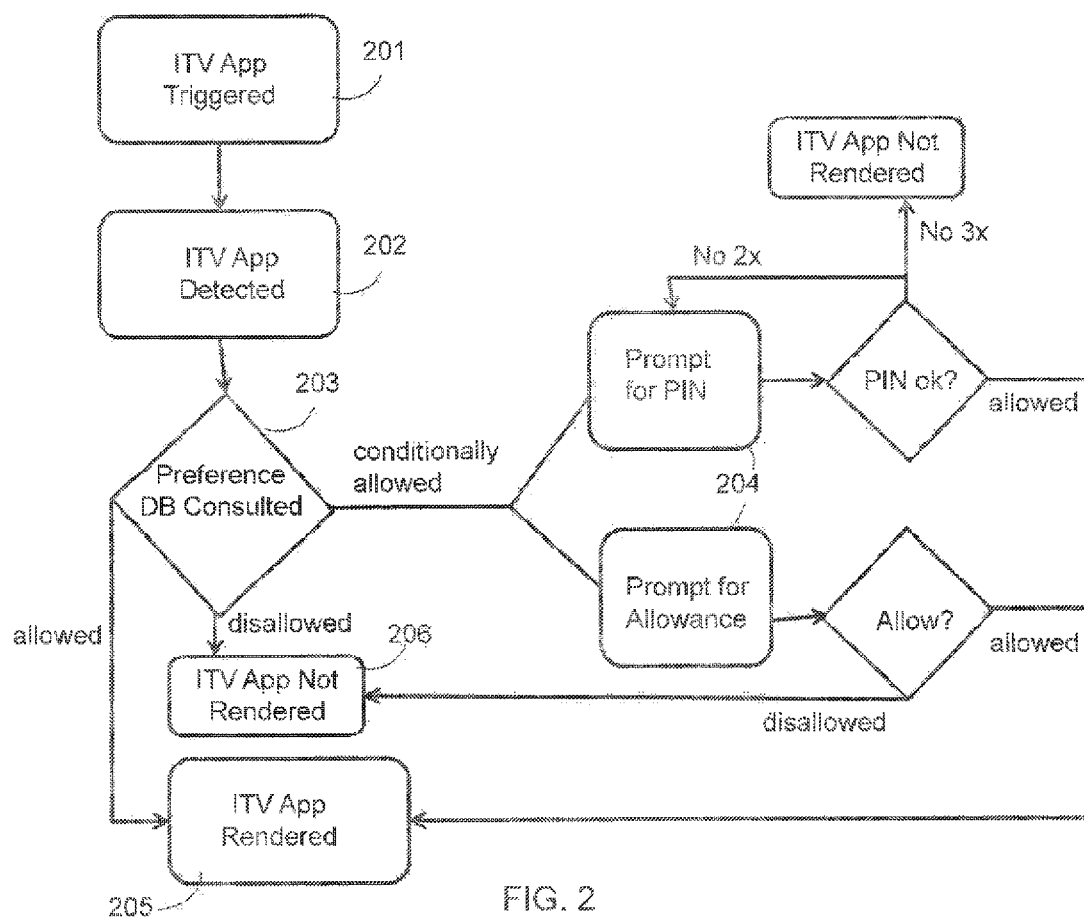
FIG. 2 is a process flow diagram illustrating an exemplary method for determining whether to execute an ITV application on a device.

FIG. 2 illustrates a process flow of an exemplary embodiment of the present subject matter for determining whether to execute a given ITV event to a viewer given the viewer's previously set preferences. In this illustration, the ITV event is triggered and delivered to the viewer's viewing device or companion device at which time the determination of whether to execute the event is made. In another embodiment the ITV event is triggered and the determination of whether to execute the event is made prior to the event reaching the viewer's viewing or companion device, for example at a cable operator's headend.

At 201, an ITV app is triggered either by a bound app arriving with the content (e.g. voting/polling opportunity on CNN) or by user interface to access unbound content (e.g. push the yellow button to access YellowPages on TV) or by some other trigger for unbound content (e.g. phone rings and caller ID is triggered). In some embodiments, the trigger can be received by a companion device 106 rather than the primary viewing device 101 or the external device 111.

At 202, the device receiving the ITV application (101, 111, and/or 106) detects the presence of the ITV Event. The device receiving the ITV Event (101, 111, and/or 106) generates a query for the database (e.g. a request for allowance package) to determine whether to execute the ITV app at 203. In some embodiments, the request for allowance package goes to the nearest preferences database (e.g. local storage 107, 108, 110, or a centrally located server 105). Based on the consumer's preferences, the system determines whether the ITV application should be allowed to be executed, conditionally allowed, or disallowed. In some embodiments, the system cross-indexes the request message with the consumer's preferences to determine allowance, conditional allowance, or disallowance. If the request tails, default responses such as the MSO-set default or the viewer-set default if available may be used.

Based on the executed query, the system may return a state such as, for example:
 a. Allow (205)
 b. Disallow (206)
 c. Conditional allowance (204)

If the device (101 and/or 106) receives an "allow" (205) from the system, the ITV application event is executed by the device.

If the device (101 and/or 106) receives a "disallow" (206) from the system, the ITV application event is not executed by the device. In some embodiments, the system can be set to provide notification to the viewer each time an ITV app event is blocked by their preferences. In some embodiments, the viewer can choose from one or more options including: allowing the app/event to run this time only, allowing the app/event to always run including this time, dismissing the message, or dismissing the message and requesting not to see such messages in the future.

If the device (101 and/or 106) receives a "conditional allowance" (204) from the system, then the device will execute the ITV app if the required one or more conditions are met. For example, in some embodiments, if a PIN is required, the viewer is prompted for their PIN and a second call to the database is required to validate the PIN. In some embodiments, if "ask me" is required, the viewer is prompted for a yes/no response and the system executes the app or not accordingly.

Figure 3:
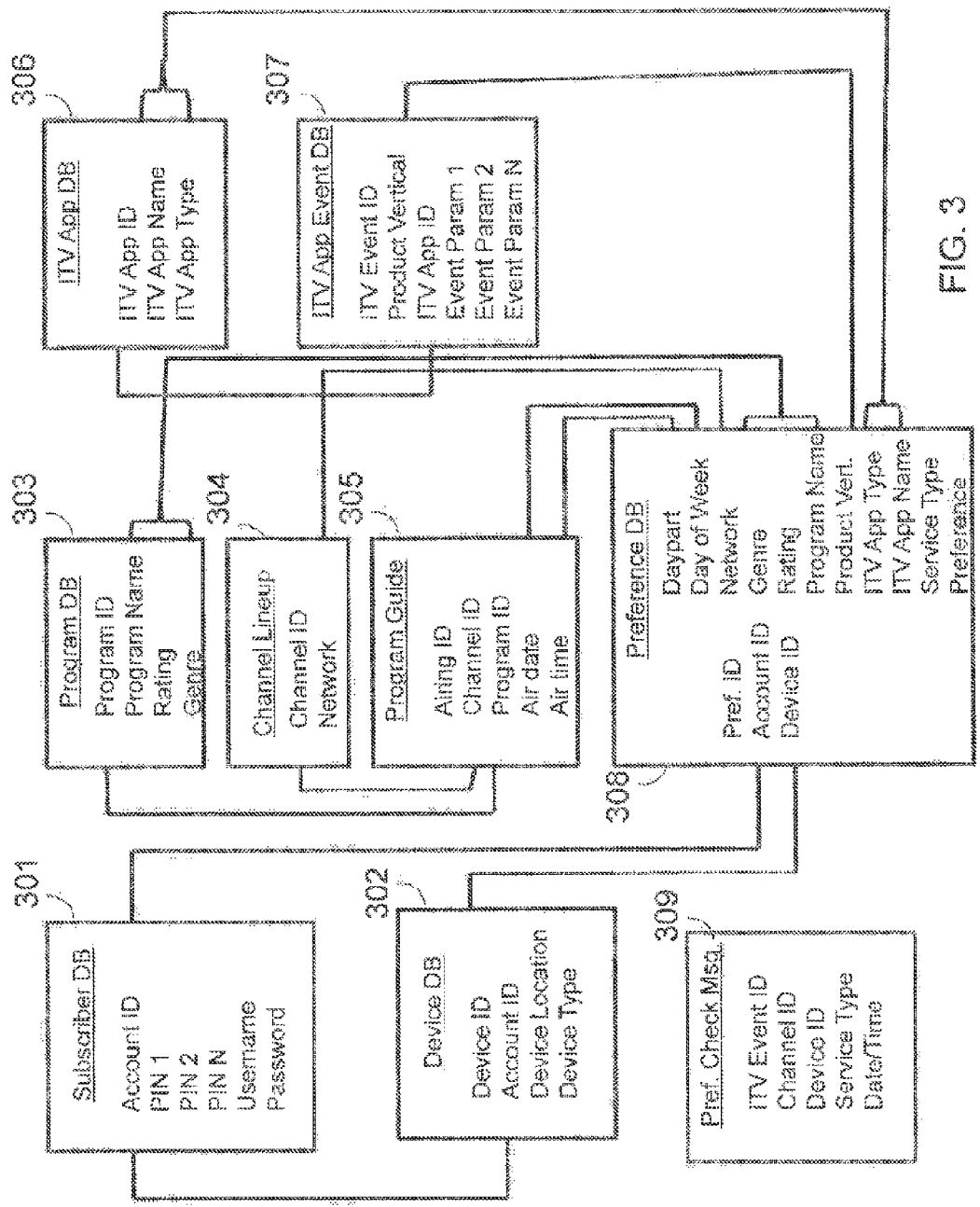
FIG. 3 illustrates an exemplary database structure for managing the consumer's ITV preferences.

FIG. 3 illustrates a sample database structure for managing the consumer's ITV Preferences. These data tables are provided for illustrative purposes only and do not show the full complexity of industry standard data tables, but rather show the key elements relevant to the present subject matter.

The Subscriber table (e.g. Subscriber Database 301) includes information on the provider's account subscribers including, for example:
  Account ID—primary key of the table
  PIN 1-*n*—some number of PINs that the account holder has chosen for his ITV interactions
  Username and password—credentials the subscriber may use to access the Preference UI 104

The Device table (e.g. Device Database 302) includes information on the devices belonging to the subscriber including, for example:
  Device ID—primary key of the table, may be a MAC address or similar
  Account ID—foreign key of the table identifying which account the device is associated with
  Device location—user-friendly name for the device such as "Living Room STB" or "John's iPad"
  Device type—type of equipment such as tablet, HD STB, SD STB, smartphone, Xbox, etc.

The Program table (e.g. Program Database 303), Channel Lineup 304 and Program Guide 305 include information regarding what's on TV such as:
  Program ID—primary key of the Program table
  Program Name—name of the program such as "Monday Night Football—Lions vs. Bears"
  Rating—program rating such as TVG or TVMA
  Genre—program genre such as sports, news, sitcom, etc.
  Channel ID—primary key of the Channel Lineup table and channel number
  Network—network assigned to that channel number such as WCVB or ESPN
  Airing ID—primary key of the Program Guide table
  Channel ID—foreign key indicating which channel the airing is on
  Program ID—foreign key indication which program is airing
  Air date—date of airing
  Air time—time of airing The ITV Application table (e.g. ITV App Database 306) includes information on which ITV apps are offered by the provider such as, for example:
  ITV App ID—primary key of the ITV App table
  ITV App Name—name of the app such as Shotime Boxing Companion or Caller ID
  ITV App Type—type of app such as game, poll, request for info, click-to-buy, etc.

The ITV Event table (e.g. ITV App Event Database 307) includes information on a given instance of an ITV App being triggered such as, for example:
  ITV Event ID—primary key of the ITV Event table
  Product Vertical—optionally used for ITV events in advertising, identifies the type of product being offered such as automotive, finance product, services, restaurant, etc.
  ITV App ID—foreign key identifying the ITV App used in this ITV Event
  Event Param 1-N—parameters of a given ITV event such as the text of a voting and polling question and its answer options The Preferences table (e.g. Preference Database 308) includes the various settings the consumer can use to create a given preference such as, for example:
  Preference ID—primary key of the Preferences table
  Account ID—foreign key identifying the subscriber the preference belongs to
  Device ID—foreign key identifying the device the preference is for
  Daypart—segment of the day that the preference is for such as mornings, primetime, after school, etc.
  Day of week—day of week the preference is for such as M-F
  Network—indicates which network the preference is for
  Genre—indicates which program genre the preference is for
  Rating—indicates which program rating the preference is for
  Program Name—indicates which program the preference is for
  Product Vertical—indicates which vertical the preference is for
  ITV App Type—indicates which App Type the preference is for
  ITV App Name—indicates which App the preference is for
  Service Type—indicates the type of service being consumed such as linear or VOD
  Preference—preference choice such as allow, disallow, PIN required, or "ask-me"

In some embodiments, when an ITV Event is triggered a message 309 is assembled for querying the Preferences Database to determine whether to execute the app or not. With a well-constructed database, very few elements are required for the Preference Cheek Message 309. This is advantageous because many return-path configurations in cable networks are very limited in bandwidth. The Preference Check Message may contain, for example, the following elements:
  ITV Event ID—carried with the ITV Event
  Channel ID—accessed internally by the external device 111 or viewing device 101
  Device ID—accessed internally by the external device 111 or viewing device 101 or companion device 106
  Service Type—such as VOD, pay per view (PPV) or linear broadcast accessed internally by the external device 111 or viewing device 101
  Date/Time—accessed internally by the external device 111 or viewing device 101 or companion device 106

FIG. 3 further depicts how each of these data tables are related and by tracing the relationships, one can understand how a Preferences Check Message with so few elements can be sufficient for a complex set of preferences.

FIGS. 4-9 illustrate a simple embodiment of the invention in which a single ITV app called Clickable TV is offered by the provider and the subscriber's preferences are merely "always allow" or "always disallow" Clickable TV Events. In this example, the Clickable TV Events 103 are to be delivered in-band 112 to a STB 111 and executed (or not) on a viewing screen 101 depending on the subscriber's preferences. In this example the preferences database is stored both locally 107 and centrally 105.

Figure 4:
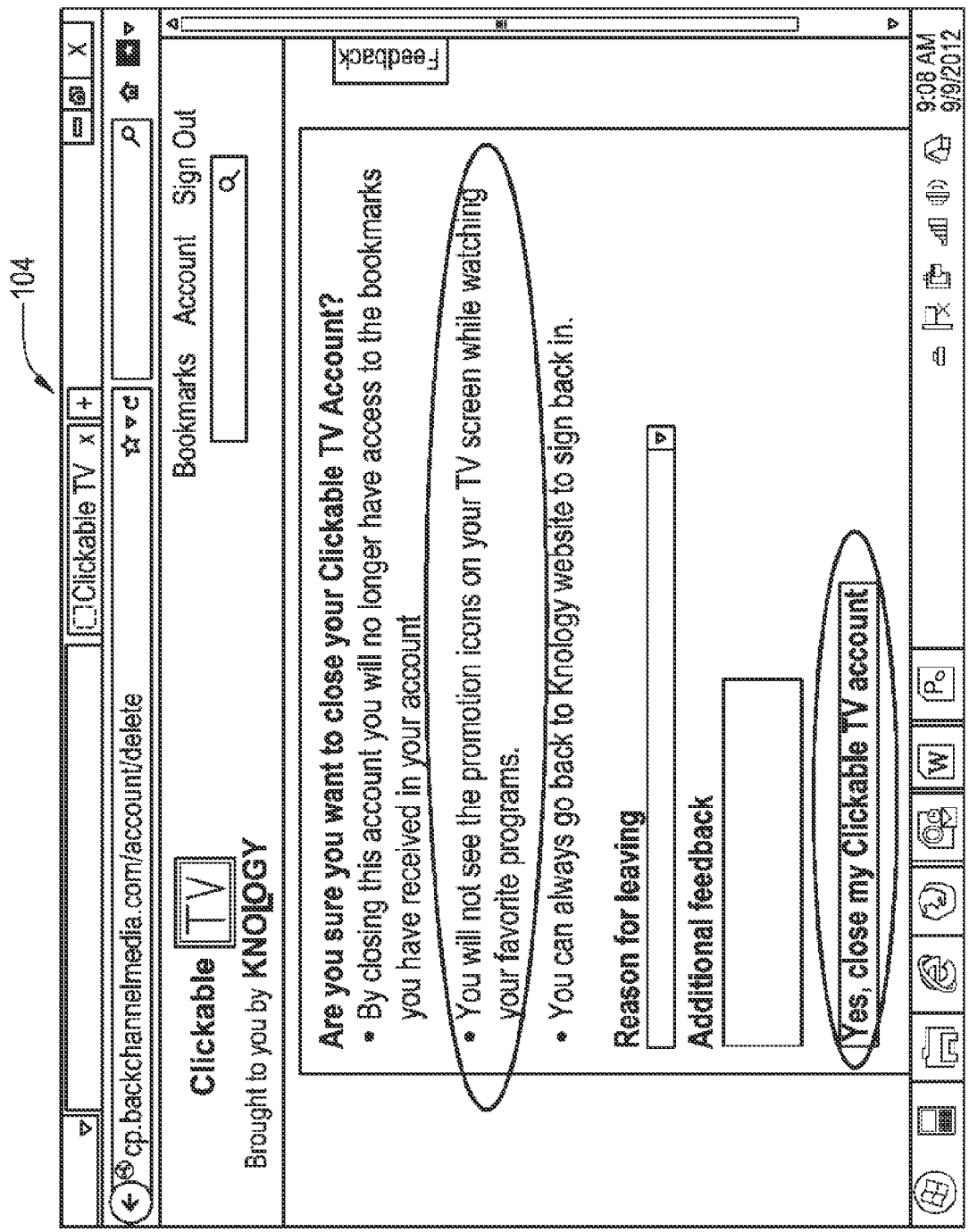
FIG. 4 illustrates an exemplary web-based UI for a consumer to set a preference for an ITV app called Clickable TV.

FIG. 4 illustrates a sample UI 104 in which the subscriber may opt-out of Clickable TV via a website. As shown, UI 104 includes input options for the user, including, for example, one or more reasons for leaving, additional feedback, and the ability to confirm the selection.

FIG. 5 illustrates a sample user preferences data table 308 in which the subscriber's preference is stored. As can be seen, the user preferences data table 308 includes a "status" field representing the status (e.g. Opt-Out, Registered, Unregistered) of the ITV event. These options will be discussed in more detail below with respect to FIG. 9. In this example, the status is "Registered". The preferences data table 308 also includes other fields relating to the user's preferences such as, for example:

id—account ID, for example, incremental value as records can be created.

crypted_password—encrypted password using, for example, the 'SALT' column.

salt—field used to generate the crypted password.

reportable—account included in reporting data through, for example, TVLM Reports.

email—account holder email.

location—cable operator account location.

subscriber_id—encrypted subscriber ID from Cable Operator.

updated_at—record modified date/time.

created at—record creating date/time.

owner_id—linked to Owner table ID field.

email_each_click—deliver one email per click to subscriber.

email_click_summary—delivery summary email, for example, weekly for all clicks to end user.

zipcode—account holder zip code.

reason—Opt in reason information.

reason_text—Opt in reason information.

clicks_per_page—displays clicks per page in, for example, a Consumer Portal.

encrypted email—encrypted email information.

FIG. 6 illustrates a sample devices data table 302 in which the devices belonging to the subscriber are stored. As shown, the device data table 302 may include, for example:

id—primary record key ID.

account_id—account linked to this set-top box.

location_id—key link to Provider_Locations table.

device_id—Device UID.

model_type_code—set-top box type information.

model—set-top box model type information.

ebif_engine—EBIF engine that is loaded in the set-top box.

with_account_since—date the set-top box became associated with this account.

created_at—record creation date/time.

updated_at—record modified date/time.

FIG. 7 illustrates a sample data table for storing Clickable TV Events 307. These data tables are primarily stored centrally 105 and a copy of a subset of this information is stored locally 107. The local database 107 connects with the central database 105 according to a configurable frequency to ensure it has the most up-to-date information. As shown, this data table may include, for example:

id—primary ID field.

bdss_id—identifies the server that executed the Playout.

tid—token ID used to identify the ITV event playout insertion_type—types including, for example (HOTBUTTON, PLAYNOW, VDCP).

segment_id—key link to the Content Segment Table.

result—Playout Result (e.g. PLAY_CMPLT, Play-ABORT).

start—Playout Start Time.

end—Playout End Time.

created_at—Record creation date/time.

updated_at—Record Modified date/time.

news_user—newscast user that launched the HOTBUTTON.

house_number—associated AD house number.

confirmed—Playout Confirmed with information stored in, for example, TVLM.

hotkey_button_id—Hotkey Button ID if playout was for HOTBUTTON otherwise "null".

FIG. 8 illustrates a sample query message 309 from the device to the local database. The query message 309 may include, for example:

deviceid—MAC address or it may be some other device ID.

devicetype—specific set-top box models are defined.

Softwareversion—internally defined in the application.

tid—ID of the ITV event requesting to be played.

FIG. 9 illustrates a sample return message 310 to the device as to whether the execute the ITV event or not. The return message may include a status, which may be for example:

Unknown—if this device or the ITV event was not found in the database. In some embodiments, the system may be configured to execute the ITV event by default.

Unregistered—if the subscriber has neither opted-in nor opted-out for this ITV event. In some embodiments, the system may be configured to execute the ITV event by default.

Registered—If the subscriber opted-in for this ITV event, execute the ITV event (i.e. allow).

Opt-out—If the subscriber has opted-out for this ITV event, do not allow (i.e. disallow) the ITV event.

Aspects of the subject matter described herein can be embodied in systems (e.g. a system including one or more computer processors), apparatus, methods (e.g. computer-implemented methods executed by one or more processors), and/or articles depending on the e desired configuration. In particular, various embodiments of the subject matter described herein can be realized in digital electronic circuitry, integrated circuitry, specially designed application specific integrated circuits (ASICs), computer hardware, firmware, software, and/or combinations thereof. These various embodiments can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a television, a computer having a display device, such as for example a cathode ray tube (CRT) or a liquid crystal display (LCD) monitor for displaying information to the user and remote control, a keyboard and/or a pointing device, such as for example a mouse or a trackball, by which the user may provide input to the display device. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The embodiments set forth in the foregoing description do not represent all embodiments consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the embodiments described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer-implemented method for allowing a user to control access to an interactive television application, the method comprising,
    performing with at least one computer processor:
        detecting an interactive television event for an interactive television application destined for a user's device;
        generating a query based on the interactive television application event to determine whether to execute the interactive television application;
        determining whether a preference database containing one or more user preferences is locally stored;
        determining a user preference by checking the query against a non-local preference database in response to the determining indicating the preference database is not locally stored and checking the query against a local preference database in response to the determining indicating the preference database is locally stored; and
        determining at least one of whether the interactive television application event is allowed, disallowed, or conditionally allowed to be executed on the user's device based on the determined user preference,
    wherein the interactive television application will not be sent to the user's device when it is determined that the interactive television application event is disallowed.

2. The method according to claim 1, wherein if the interactive television application is conditionally allowed to be executed on the user's device, the method further comprises: generating a prompt to the user for a required input;
    receiving the input from the user; and
    checking whether the input meets a specified condition before executing the interactive television event on the user's device.

3. The method according to claim 2, wherein the required input is a personal identification number (PIN).

4. The method according to claim 1, wherein the preference database comprises data indicative of one or more circumstances for allowing, disallowing, or conditionally allowing the interactive television application event to be executed on the user's device.

5. The method according to claim 4, wherein the one or more circumstances include one or more of an identification of the user's device, channel information, a type of service, a type of programming, a type of offer, a type of product, time of day, day of week, password protection, program rating, and a viewing device type.

6. The method according to claim 1, further comprising providing a user interface through which the user can define one or more circumstances for allowing, disallowing, or conditionally allowing the interactive television application event to be executed on the user's device.

7. The method according to claim 1, further comprising copying the preference database from a central server to a database on the user's device.

8. The method according to claim 1, wherein the preferences database is stored on a central server.

9. The method according to claim 1, further comprising copying the preferences database to a second user device.

10. The method according to claim 1, wherein the preference database is the nearest preferences database.

11. A system for allowing a user to control access to an interactive television application, the system comprising:
    one or more computer processors configured to detect an interactive television application event destined for a user's device, generate a query based on the interactive television application event to determine whether to execute the interactive television application, determine whether a preference database containing one or more user preferences is locally stored, determine a user preference by checking the query against a non-local preference database in response to determining the preference database is not locally stored and checking the query against a local preference database in response to determining the preference database is locally stored, and determine at least one of whether the interactive television application event is allowed, disallowed, or conditionally allowed to be executed on the user's device based on the determined user preference, wherein the interactive television application will not be sent to the user's device when it is determined that the interactive television application event is disallowed.

12. The system according to claim 11, wherein the one or more computer processors are further configured to:
generate a prompt to the user for a required input if the interactive television event is determined to be conditionally allowed;
receive the input from the user; and
check whether the input meets a specified condition before executing the interactive television on the user's device.

13. The system according to claim 12, wherein the required input is a personal identification number (PIN).

14. The method according to claim 11, wherein the preference database comprises data indicative of one or more circumstances for allowing, disallowing, or conditionally allowing the interactive television application to be executed on the user's device.

15. The system according to claim 14, wherein the one or more circumstances include one or more of: an identification of the user's device, channel information, a type of service, a type of programming, a type of offer, a type of product, time of day, day of week, password protection, program rating, and a viewing device type.

16. The system according to claim 11, wherein the one or more computer processors are further configured to provide the user interface through which the user can define one or more circumstances for allowing, disallowing, or conditionally allowing the interactive television application events to be executed on the user's device.

17. The system according to claim 11, wherein the one or more computer processors are further configured to copy preferences from a central server to a database on the user's device.

18. The system according to claim 11, further comprising a central server on which the preference database is stored.

19. The system according to claim 11, wherein the one or more computer processors are further configured to copy at least one preference from the preference database to a second user device.

20. The system according to claim 11, wherein the user device is a television, an external device, or a companion device.

21. The system according to claim 11, wherein the preference database is the nearest preferences database.

22. A non-transitory computer-readable medium comprising computer instructions for performing the method comprising:
detecting an interactive television event for an interactive television application sent to a user's device;
generating a query based on the interactive television application event to determine whether to execute the interactive television application;
determining whether a preference database containing one or more user preferences is locally stored;
determining a user preference by checking the query against a non-local preference database in response to the determining indicating the preference database is not locally stored and checking the query against a local preference database in response to the determining indicating the preference database is locally stored; and
determining at least one of whether the interactive television application is allowed, disallowed, or conditionally allowed to be executed on the user's device based on the determined user preference,
wherein the interactive television application will not be sent to the user's device when it is determined that the interactive television application event is disallowed.

* * * * *